(12) United States Patent
Tsuji et al.

(10) Patent No.: US 11,199,247 B2
(45) Date of Patent: Dec. 14, 2021

(54) WINDING TRANSMISSION BODY TENSION DEVICE

(71) Applicant: DAIDO KOGYO CO., LTD., Ishikawa (JP)

(72) Inventors: Naoto Tsuji, Ishikawa (JP); Hideaki Seki, Ishikawa (JP)

(73) Assignee: DAIDO KOGYO CO., LTD., Ishikawa (JP)

( * ) Notice: Subject to any disclaimer, the term of this patent is extended or adjusted under 35 U.S.C. 154(b) by 310 days.

(21) Appl. No.: 16/419,160

(22) Filed: May 22, 2019

(65) Prior Publication Data

US 2019/0277371 A1     Sep. 12, 2019

Related U.S. Application Data

(63) Continuation of application No. PCT/JP2017/036315, filed on Oct. 5, 2017.

(30) Foreign Application Priority Data

Nov. 25, 2016  (JP) .............................. JP2016-229375

(51) Int. Cl.
F16H 7/08       (2006.01)
(52) U.S. Cl.
CPC ............. *F16H 7/08* (2013.01); *F16H 7/0848* (2013.01); *F16H 2007/0802* (2013.01);
(Continued)
(58) Field of Classification Search
CPC ............... F16H 7/08; F16H 2007/0802; F16H 2007/0806; F16H 2007/0812;
(Continued)

(56) References Cited

U.S. PATENT DOCUMENTS 4,099,298 A * 7/1978 Gimenez ................. F16L 33/03
                                                           24/27
5,050,275 A * 9/1991 Schroer .................... F16L 33/03
                                                           24/283
(Continued)

FOREIGN PATENT DOCUMENTS

JP      40-4546     2/1965
JP      3670911     7/2005
(Continued)

OTHER PUBLICATIONS

WO2009/000354A1 Translation; Bodensteiner et al; Tensioning Device With A Spring Ring Element As A Transport Securing Means; published: Dec. 31, 2008; Espacenet/ EPO (Year: 2008).*

(Continued)

*Primary Examiner* — Michael R Mansen
*Assistant Examiner* — Raveen J Dias
(74) *Attorney, Agent, or Firm* — Wenderoth, Lind & Ponack, L.L.P.

(57) ABSTRACT

A resister clip (35) includes engage portions (35*a*) engaging with an engage groove, a spring portion (35*b*) and operating portions (35*c*). The spring portion (35*b*) can be designed with a high degree of freedom in terms of a coil number of turns, a winding diameter and others and the engage portions (35*a*) are widened centering on the spring portion (35*b*), so that diameter-widening resistance can be optimized.

7 Claims, 7 Drawing Sheets

(52) U.S. Cl.
CPC ............. *F16H 2007/0806* (2013.01); *F16H 2007/0812* (2013.01); *F16H 2007/0855* (2013.01); *F16H 2007/0859* (2013.01); *F16H 2007/0891* (2013.01)

(58) Field of Classification Search
CPC .......... F16H 7/0848; F16H 2007/0851; F16H 2007/0855; F16H 2007/0859; F16H 2007/0891; F16H 2007/0895; F16H 2007/0897; F16B 21/18; F16B 21/183; F16B 21/186; F16L 33/03
USPC ........................................................ 474/110
See application file for complete search history.

(56) References Cited

U.S. PATENT DOCUMENTS

| | | | | |
|---|---|---|---|---|
| 5,083,347 | A * | 1/1992 | Bucciero | F16L 33/03 24/20 CW |
| 6,244,981 | B1 * | 6/2001 | Simpson | F16H 7/0848 474/110 |
| 2006/0281595 | A1 * | 12/2006 | Narita | F16H 7/0848 474/109 |
| 2007/0213152 | A1 * | 9/2007 | Yamamoto | F16H 7/0848 474/109 |
| 2011/0021298 | A1 * | 1/2011 | Kurematsu | F16H 7/0836 474/110 |
| 2012/0040790 | A1 * | 2/2012 | Perissinotto | F16H 7/08 474/110 |
| 2012/0309570 | A1 * | 12/2012 | Kurematsu | F16H 7/0848 474/110 |
| 2013/0190117 | A1 * | 7/2013 | Bauer | F16H 7/08 474/111 |
| 2013/0281238 | A1 * | 10/2013 | Kurematsu | F16H 7/08 474/101 |
| 2016/0061299 | A1 * | 3/2016 | Takagi | F16H 7/0848 474/101 |
| 2020/0011401 | A1 * | 1/2020 | Kurematsu | F16H 7/0848 |
| 2020/0011402 | A1 * | 1/2020 | Magni | F16H 7/0848 |
| 2020/0400218 | A1 * | 12/2020 | Freemantle | F16H 7/0848 |

FOREIGN PATENT DOCUMENTS

| | | |
|---|---|---|
| JP | 2007-85375 | 4/2007 |
| JP | 3929680 | 6/2007 |
| WO | 2009/000354 | 12/2008 |

OTHER PUBLICATIONS

International Search Report dated Dec. 5, 2017 in International (PCT) Application No. PCT/JP2017/036315.

* cited by examiner

POSITION I

POSITION II

POSITION III

WINDING TRANSMISSION BODY TENSION DEVICE

CROSS-REFERENCE TO RELATED APPLICATIONS

This application is a Continuation of International Patent Application No. PCT/JP2017/036315, filed Oct. 5, 2017, which claims the benefit of Japanese Patent Application No. 2016-229375, filed Nov. 25, 2016, both of which are hereby incorporated by reference herein in their entirety.

BACKGROUND OF THE INVENTION

Field of the Invention

The present invention relates to a winding transmission body tension device operative to adjust a tension of a winding transmission body such as a chain and a belt.

Description of the Related Art

In general, a tension device operative to apply a tension to a loose side of a transmission using a winding transmission body such as a chain and a belt is used for the transmission. As for a timing chain transmission transmitting rotation of a crankshaft to a camshaft in particular, there is known a chain tensioner that tensions the timing chain by acting hydraulic pressure of a hydraulic pump driven by an engine and an urging force of a return spring on a plunger.

In a condition in which an engine stops and no hydraulic pressure acts on the plunger, the chain tensioner prevents the plunger from setting back by locking the plunger in a manner of a ratchet by interposing a resister clip (resister ring) between an engage groove defined on an outer circumferential surface of the plunger and a guide groove formed on housing serving as a cylinder to prevent the plunger from being pushed in by a tension from the chain (see Japanese Patent No. 3670911 and Japanese Patent No. 3929680).

As illustrated in FIG. 7A, the resister clip 1 includes a ring portion 1a and operating portions 1b bent from both ends of the ring portion 1a urged toward diameter-reducing sides. Then, in a case where a tension in a setback direction acts on the plunger based on the tension of the chain, the ring portion 1a engages between a lock surface of the engage groove and a stop surface of the guide groove and blocks the setback of the plunger. In a case where a force in a forward direction acting on the plunger surpasses the pressure from the chain by the urging force of the return spring and the hydraulic pressure, the plunger projects and removes the looseness of the chain through a tensioner arm. At this time, the ring portion 1a is radially widened while moving a tapered surface of the engage groove by resisting against the urging force in a diameter-reducing direction acting on the ring portion 1a itself. Still further, in a case where the chain is elongated, the ring portion 1a transfers to a rear engage groove. Thereby, the plunger moves forward by one engage groove. In a case where the plunger is to be removed for maintenance, it is possible to remove the plunger out of the housing by radially widening the ring portion 1a by resisting against the urging force and releasing the ring portion 1a from the engage groove by pinching and the operating portions 1b of the resister clip 1 and pressing in directions of the arrows as illustrated in FIG. 7B.

SUMMARY OF THE INVENTION

The resister clip 1 is constituted of a torsion spring wound approximately by one turn and includes the ring portion 1a of one turn which itself serves as a part fastening the engage groove (tapered surface) of the plunger in the diameter-reducing direction and the operating portions 1b bent and extending from the ring portion 1a while having free ends.

The ring portion 1a is formed of the torsion coil spring having a large diameter which is approximately equal to a diameter of the plunger to engage with the engage groove on the plunger. The ring portion 1a needs to be what is one-turned to be an engage member interposed between the engage groove and the stop surface of the housing. Then, such a large energy that deforms the entire ring portion 1a having the large diameter is required for the one-turn torsion coil spring to move along the tapered surface on the outer circumferential surface of the plunger and to widen the diameter of the one-turn torsion coil spring by resisting against the fastening force acting on the spring itself.

Then, in order to move the plunger forward to absorb variation of the tension caused by elongation of the chain, a return spring having a relatively large urging force that surpasses the large energy described above is required. Thereby, a large pressure caused by the return spring acts always on the plunger and a large load acts on the chain through the chain tensioner. As a result, a friction between the chain tensioner and the chain increases and causes a decrease of fuel-efficiency.

In a case where a return spring having a small urging force is used and where the chain is loosened, there is a case where an energy of widening a diameter of the resister clip 1 along the tapered surface becomes deficient and the plunger cannot be timely moved forward, thus generating abnormal sound and tooth skipping of the chain.

It is conceivable to reduce a diameter-widening resistant force of the resister clip 1 by changing a wire diameter and a winding diameter in order to optimize a projecting force of the plunger in the chain tensioner. However, because the wire diameter and the winding diameter of the resister clip are defined by a diameter of the plunger and the engage groove, their change is limited. Also because the ring portion 1a itself is a source of generating the spring force, the reduction of the diameter-widening resistant force of the resister clip is limited, and it is difficult to optimize the projecting force of the plunger.

Due to that, Japanese Patent No. 3929680 proposes to reduce sliding resistance generated when the resister clip slides on the tapered surface along with the forward and rearward movement of the plunger by reducing surface roughness (e.g., 6.3 µm or less) of tapered surface (sliding face) on which the resister clip slides. However, the reduction of the surface roughness requires a cumbersome work and an effect thereof is not enough. That is, there is a limit in optimizing the projecting force of the plunger.

Then, the present disclosure aims at providing a winding transmission body tension device (e.g., chain tensioner) that solves the abovementioned problems by using a resister clip provided with a spring portion that applies an engagement force to an engage portion besides the engage portion that engages with a plunger.

According to one aspect of the present invention, a winding transmission body tension device of the present disclosure includes a housing in which a cylinder is formed, a plunger sliderably fitted into the cylinder formed in the housing, a return spring compressed between a bottom portion of the cylinder and the plunger, and a resister clip interposed between one of a plurality of engage grooves disposed on one of an inner circumferential surface of the cylinder and an outer circumferential surface of the plunger and a guide groove disposed on another one of the inner circumferential surface of the cylinder and the outer circumferential surface of the plunger and permits the plunger to move in a forward direction in conformity with an urging force of the return spring and regulates the plunger from moving in a setback direction resisting against the urging force of the return spring. The resister clip includes engage portions engageable with an engage groove, a spring portion operative to apply a urging force to the engage portion in a direction of engaging with the engage groove and operating portions operative to release the engage portions out of the engage groove.

Further features of the present invention will become apparent from the following description of exemplary embodiments with reference to the attached drawings.

DESCRIPTION OF THE EMBODIMENTS

Figure 1:
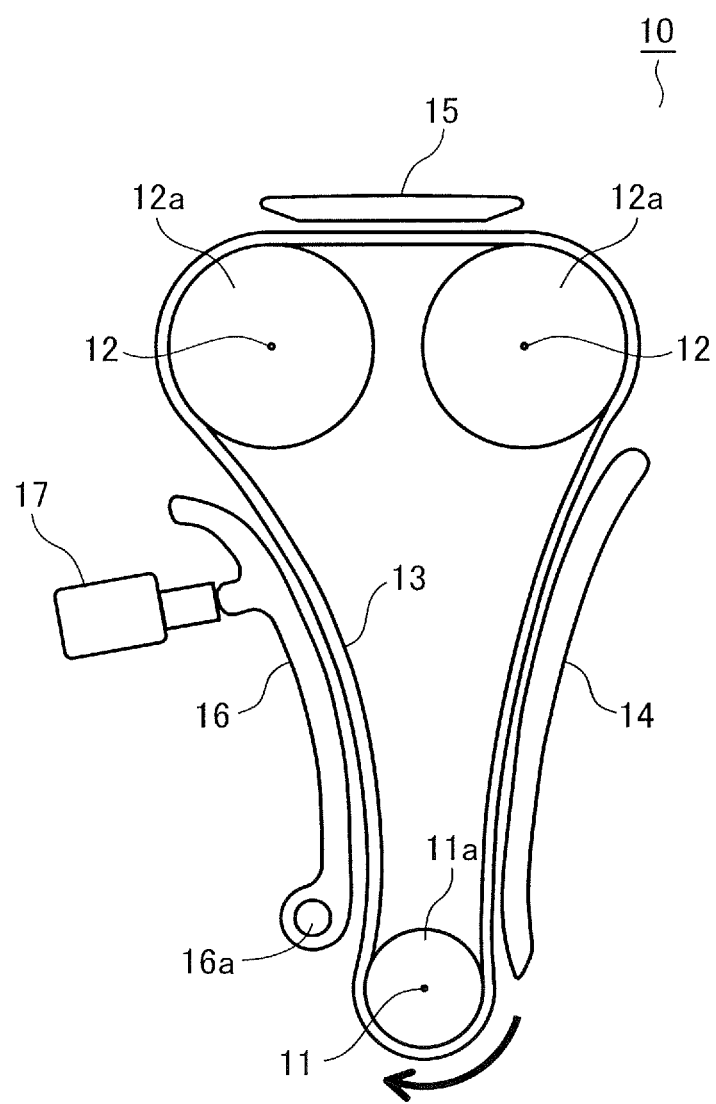
FIG. 1 is a front view illustrating an outline of a timing chain transmission device.

Embodiments of the present disclosure will be described below with reference to the drawings. As illustrated in FIG. 1, a timing chain transmission device 10 disposed within an engine includes a crank sprocket 11a fixed to a crank shaft 11, two sprockets 12a fixed to two camshafts 12 and a timing chain 13 wound around the crank sprocket 11a and the cam sprockets 12a. The timing chain 13 serving as a winding transmission body is in sliding contact with chain guides 14 and 15 at two tension sides thereof and is in sliding contact with a tensioner arm 16 on a loose side thereof. The chain guides 14 and 15 are fixed to an engine block, and one end of the tensioner arm 16 is swingably supported by a spindle 16a and another end thereof is in contact with a chain tensioner 17. It is noted that the timing chain 13 is applicable to any one of a silent chain, a roller chain and a bush chain, and the spindle 16a of the tensioner arm 16 may be located upstream or downstream in a chain traveling direction.

Figure 2:
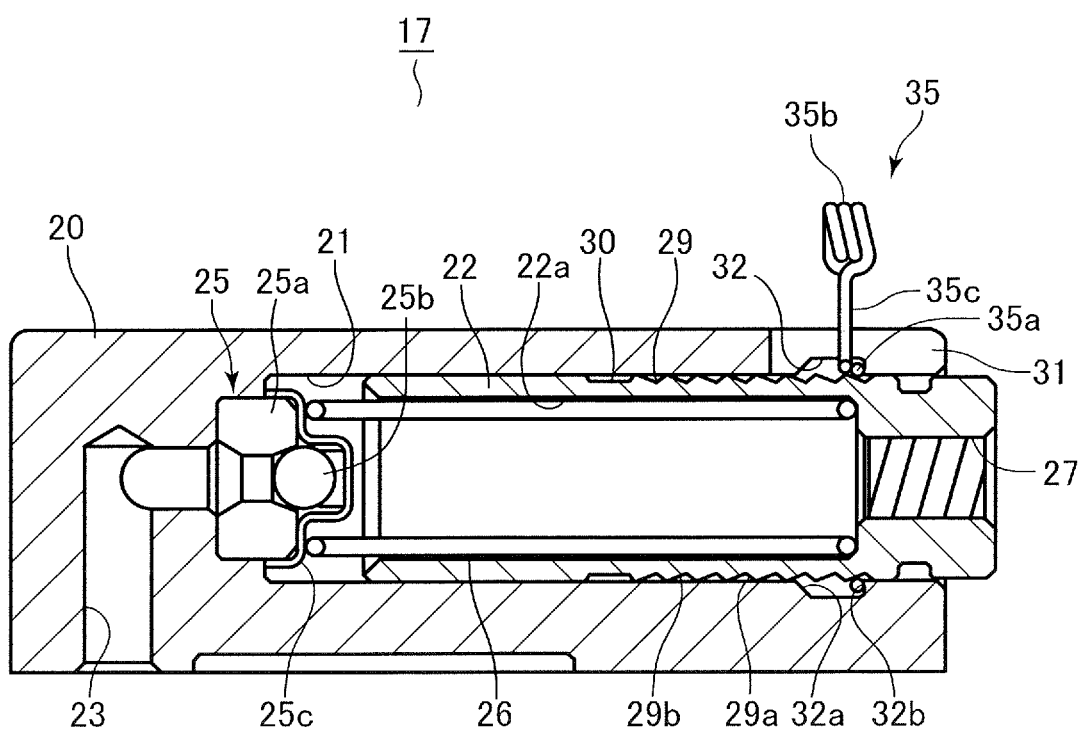
FIG. 2 is a section view illustrating a chain tensioner to which the present disclosure is applied.

As illustrated in FIG. 2, the chain tensioner 17 serving as the winding transmission body tension device includes a housing 20 fixed to an engine block. The housing 20 is provided with a cylinder 21 defined therein and having one open end. A plunger 22 is slidably fitted into the cylinder 21. The housing 20 is provided with a supply port 23 defined so as to communicate with a bottom portion of the cylinder 21 and through which hydraulic pressure is supplied from a hydraulic pump driven by the engine. A check valve 25 is attached to the bottom portion of the cylinder 21 communicating with the supply port 23. The check valve 25 includes a valve seat 25a, a valve element (check ball) 25b and a retainer 25c retaining the valve element. The check valve 25 supplies hydraulic oil within the supply port 23 to the cylinder 21 by releasing the valve 25b from the valve seat 25a in a case where hydraulic pressure of the supply port 23 is higher than hydraulic pressure within the cylinder 21 and blocks the oil within the cylinder 21 from leaking to the supply port 23 in a case where the hydraulic pressure within the cylinder 21 is higher by seating the valve 25b to the valve seat 25a.

The plunger 22 is formed into a bottomed hollow shape, and a return spring 26 is compressed in the hollow portion 22a of the plunger 22 between the bottom portion thereof and the retainer 25c of the check valve 25. An air bleeding portion 27 to which an air bleeding member such as a screw-groove like orifice, a check valve or the like can be attached is defined at the bottom portion. The plunger 22, the cylinder 21, the return spring 26 and the check valve 25 compose a hydraulic damper in which the hydraulic oil is filled, and a front end of the plunger 22 serving as a movable part of the hydraulic damper abuts with the tensioner arm 16 to apply adequate tension to the timing chain 13.

A plurality (eight for example) of engage grooves 29 is arrayed on an outer circumferential surface of the plunger 22 at predetermined intervals in an axial direction. These engage grooves 29 are annular and are each provided with a locking surface 29a formed with a relatively large angle (rising closely to a radial surface) toward a front end side (forward side) and with a tapered surface 29b formed with a relatively small angle (laid down closely a plane in an axial direction) toward a base end side (rear side). An annular retaining groove 30 whose both ends are relatively angled is formed on the rear side of the engage groove 29 on the outer circumferential surface of the plunger.

Provided at an upper part of an opening of the cylinder 21 in the housing 20 is a cutout 31 having a predetermined length from the opening, and an annular guide groove 32 is defined on an inner circumferential surface of the cylinder 21 of the cutout 31. The guide groove 32 has a predetermined axial length and includes a first stop surface 32a formed so as to have a predetermined angle, e.g., 45 degrees, at its rear side end and a second stop surface 32b formed so as to be close to vertical at its front side end.

Figure 3A:
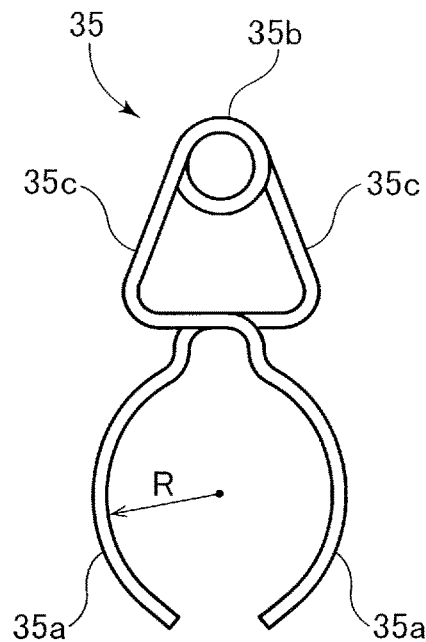
FIG. 3A is a front view of a resister clip of the chain tensioner in a natural condition.
Figure 3B:
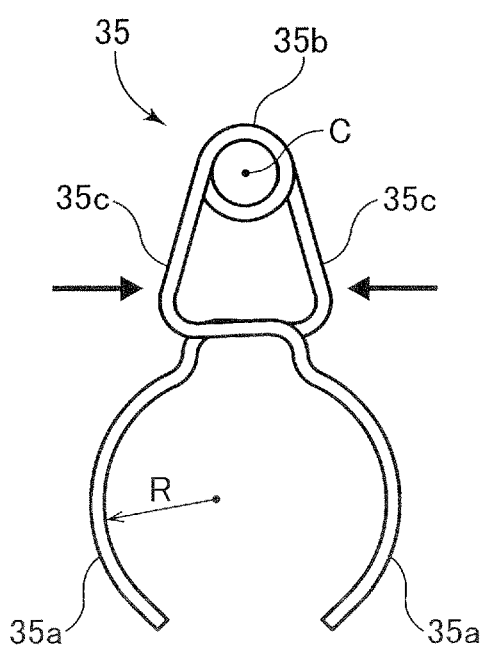
FIG. 3B is a front view of the resister clip of the chain tensioner in a condition in which the operating portions are pinched.

Interposed between the engage groove 29 and the guide groove 32 is a resister clip 35 of the present disclosure. As illustrated in FIGS. 3A and 3B, the resister clip 35 includes engage portions 35a engaging with the engage groove 29, a spring portion 35b applying an urging force in a diameter-reducing direction to the engage portions 35a, and operating portions 35c operating the engage portions 35a in a diameter-widening direction. According to the present embodiment, the spring portion 35b is formed of a torsion coil spring of a predetermined number of turns, and the operating portions 35c are formed by extending from both ends of the spring portion 35b obliquely so as to separate from each other in a width direction such that a pinching operation can be made. The both ends of the torsion coil spring extend from the operating portions 35c to form the arc-shaped engage portions 35a. Accordingly, the engage portions 35a are composed of free ends of the torsion coil spring and are formed of arc-shaped faces facing with each other with a certain radius R generating no own spring force. The both ends of the spring portion 35b are separated from each other in the axial direction, extend obliquely or axially at the operating portion 35c and are formed on one plane vertical to the plunger 22 at the engage portion 35a. Both ends of the engage portions 35a of the resister clip 35 are separated from each other by a predetermined distance and do not form a ring. That is, the resister clip 35 is interposed between one of the plurality of engage grooves 29 disposed on one of an inner circumferential surface of the cylinder 21 and an outer circumferential surface of the plunger 22 and the guide groove 32 disposed on the other one of the inner circumferential surface of the cylinder 21 and the outer circumferential surface of the plunger 22. The resister clip 35 is configured to permit the plunger 22 to move in the forward direction in conformity with an urging force of the return spring 26 and to regulate the plunger 22 from moving in a setback direction resisting against the urging force of the return spring 26.

The resister clip 35 is disposed such that a lower side of the operating portion 35c is sandwiched by both side surfaces of the cutout 31 of the housing 20, the spring portion 35b is positioned above that and the engage portion 35a is disposed so as to clamp the engage groove 29. A torsion force of the spring portion 35b acts on the engage portions 35a by increasing a movement (decreasing the torsion force) thereof by a length of the operating portion 35c from the both ends thereof.

Next, an operation of the chain tensioner of the present embodiment will be described. While rotating the engine, a rotation in a direction of an arrow of the crank shaft 11 rotates the camshaft 12 through a crank sprocket 11a, the timing chain 13 and the cam sprockets 12a and rotates the cam by matching timing with the rotation of the engine. At this time, the timing chain 13 travels while being guided by the chain guide by its back surface and by being in sliding contact with the tensioner arm 16 by its loose side back surface. The tensioner arm 16 applies an appropriate tension to the timing chain 13 swingably by being supported by the spindle 16a and by being pressed by the chain tensioner 17.

In the chain tensioner 17, the hydraulic pressure from the hydraulic pump driven by the engine is supplied into the cylinder 21 through the supply port 23 and the check valve 25 during when the engine is driven. Accordingly, a resultant force of the hydraulic pressure and the return spring 26 acts on the plunger 22 and acts also on the timing chain 13 through the tensioner arm 16.

In a case where the timing chain 13 is tightened and presses the plunger 22 by surpassing the resultant force, the plunger 22 sets back by moving by an axial length of the guide groove 32 within a length coming into contact with the first stop surface 32a from a condition in which the resister clip 35 is position between a locking surface 29a of the predetermined engage groove 29 and a second stop surface 32b of the guide groove 32. The move of the plunger 22 is made in a condition in which the check valve 25 is closed and oil is filled in the cylinder 21 composing the hydraulic damper. Accordingly, the move of setback of the plunger 22 is made slowly by a damping function of the hydraulic damper. That is, due to the setback movement, an excessive working oil within the cylinder 21 leaks out of the housing 20 through a very small gap between the plunger 22 and the cylinder 21 and through (an orifice of) the air bleeding portion 27.

Figure 4A:
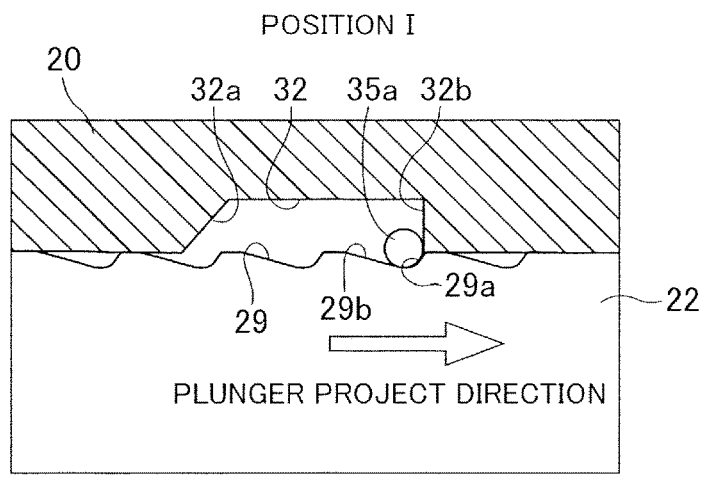
FIG. 4A is a partial front view illustrating the resister clip located at position I when a plunger moves in a project direction.
Figure 4B:
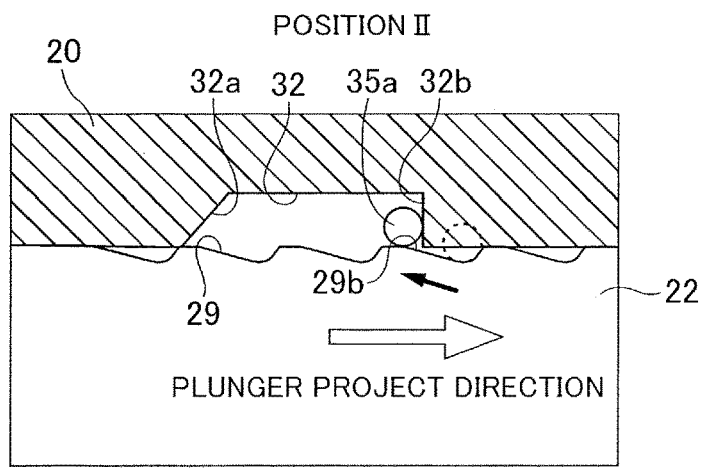
FIG. 4B is a partial front view illustrating the resister clip located at position II.
Figure 4C:
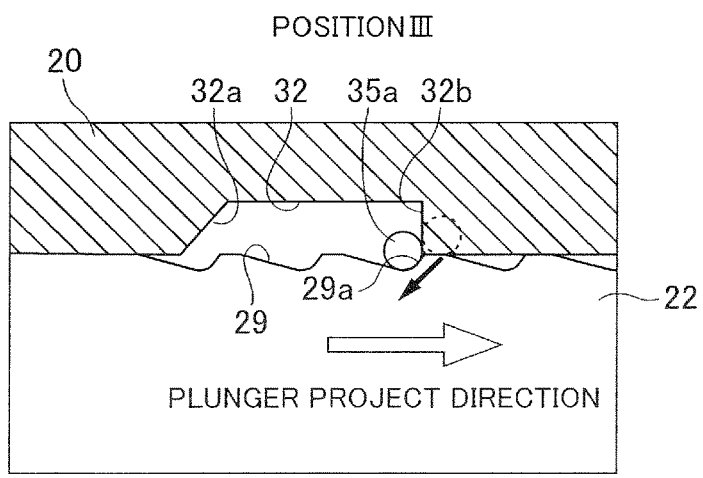
FIG. 4C is a partial front view illustrating the resister clip located at position III.

In a case where the timing chain 13 is elongated and is loosened, and the resultant force of the hydraulic pressure and the return spring 26 surpasses the pressure from the timing chain 13, the plunger 22 moves in the forward direction. At this time, the resister clip 35 moves forward to the second stop surface 32b of the guide groove 32 (position I in FIG. 4A). In a case where the plunger 22 moves forward further, the resister clip 35 moves along the tapered surface 29b of the engage groove 29 while widening the distance between the engage portions 35a that face with each other in a condition in which the resister clip 35 abuts with the second stop surface 32b (position II in FIG. 4B). Then, the engage portions 35a of the resister clip 35 move beyond a crest of the engage groove 29 adjacent to a rear side and engage with the locking surface 29a (position III in FIG. 4C). Thereby, the plunger 22 moves in the forward direction by one pitch and tensions the timing chain 13 by that degree. Thereby, the chain tensioner 17 keeps the timing chain 13 in an adequate tension condition by the damping operation based on the hydraulic damper while absorbing the elongation of the timing chain 13 caused by its aged deterioration.

In a case where the engine is stopped, the drive of the hydraulic pump is also stopped and the supply of the hydraulic pressure to the cylinder 21 through the supply port 23 is stopped. Even in this condition, there is also a case where the plunger 22 is pushed back in connection with a stop position of the cam. That is, there is a case where the plunger 22 is pushed back largely because a weight of a vehicle acts on the loose side of the timing chain 13 depending on a stop position and gear position of the vehicle. Even in such a case, the resister clip 35 is positioned between the locking surface 29a of the engage groove 29 and the first stop surface 32a of the guide groove 32, so that the plunger 22 will not largely set back. Accordingly, the chain tensioner 17 sets back just by a moving range based on the length of the guide groove 32, and the timing chain 13 is not loosened largely. Therefore, it is possible to prevent tooth-skip or abnormal sound otherwise caused by the looseness of the timing chain 13 from being generated and to prevent the plunger 22 from abruptly moving forward and from absorbing air.

Figure 5A:
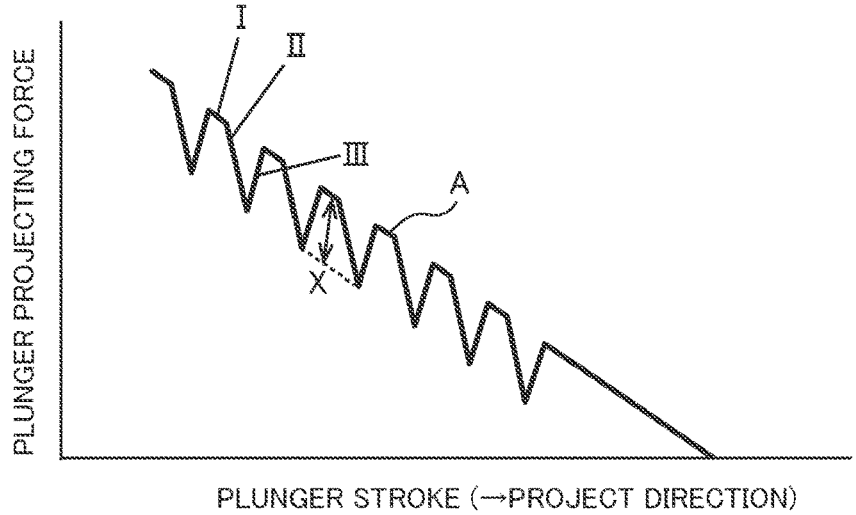
FIG. 5A is a graph indicating a plunger projecting force in a case where a prior art resister clip is used.
Figure 7A:
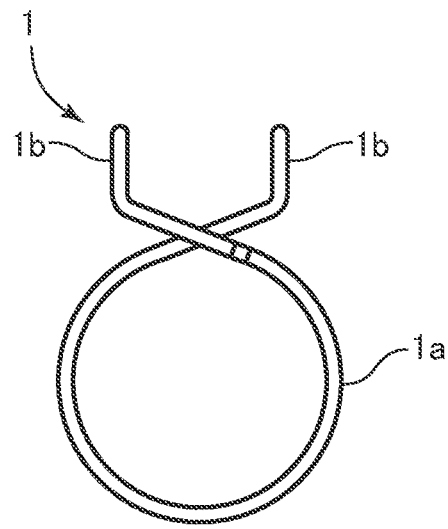
FIG. 7A illustrates a resister clip according to a prior art in a natural condition.
Figure 7B:
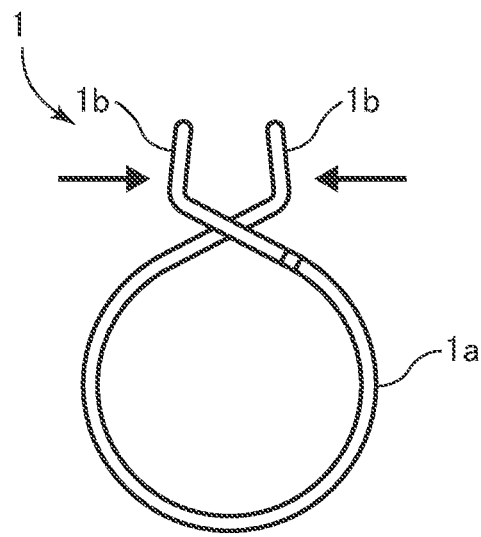
FIG. 7B illustrates the resister clip according to the prior art in a condition in which operating portions re pinched.

In a conventional resister clip (ring) 1 as illustrated in FIGS. 7A and 7B, a ring portion 1a itself is formed of a large torsion coil spring of one turn, and a diameter of the entire ring portion 1a increases in order to widen a diameter along the tapered surface 29b. Accordingly, because the ring portion 1a itself which is a source of resilience becomes an engage portion, the resister clip 1 is defined by a plunger diameter and by a shape of the engage groove 29. Thus, a degree of freedom of design of the resilient force is limited, and it is difficult to keep diameter widening resistance to be less than a predetermined value. Still further, the ring portion 1a is formed into approximately a perfect annular shape and moves along the tapered surface 29b (the position II in FIG. 4B) while moving in the axial direction of widening the radial direction from a condition in which the ring portion 1a is in contact with the tapered surface 29b of the engage groove 29 along its entire circumstance and winds up the tapered surface 29b (the position I in FIG. 4A). Therefore, the ring portion 1a needs to move by surpassing a large static frictional force in the axial direction and in the tapered surface direction of the ring portion 1a in stating the move. Therefore, a projecting force of the plunger 22 decreases if the conventional resister clip 1 is used because diameter widening resistance of the ring portion 1a caused by the tapered surface 29b increases in starting to move in particular to widen the diameter. FIG. 5A indicates a plunger projecting force in a case where the conventional resister clip is used. I through III in FIG. 5A correspond respectively to the positions I through III in FIGS. 4A, 4B and 4C. FIG. 5A indicates a decrease width of the plunger projecting force A when the resister clip 1 moves beyond the tapered surface 29b by X. The projecting force A of the plunger 22 becomes smallest when the resister clip 1 moves beyond a crest of each engage groove 29.

It is necessary to apply a predetermined tension force to the timing chain 13 even in a condition in which a rise of the hydraulic pressure supplied from the hydraulic pump is not enough in starting the engine or the like, so that an urging force of the return spring 26 corresponding to that is required. As described above, because the conventional resister clip 1 generates a large resistant force in widening the diameter by the tapered surface 29b, the return spring 26 needs an urging force (load) greater than the plunger projecting force A in FIG. 5A by considering the decrease with X of the plunger projecting force in moving beyond the respective engage grooves 29.

The resister clip 35 of the present embodiment illustrated in FIG. 3 includes the spring portion 35b separately from the engage portions 35a and permits to use the torsion coil spring of a predetermined number of turns and of a winding diameter. Accordingly, a degree of freedom of design is significantly improved. Still further, the spring portion 35b is positioned distant from the engage portions 35a in sliding contact with the tapered surface 29b through the operating portions 35c, and a torsion resilient force of the spring portion 35b acts on the engage portions 35a by proportionally decreasing by the distance. Accordingly, a diameter-reducing force acting on the tapered surface 29b of the engage groove 29 from the engage portions 35a can be small force which has been decreased proportionally by the distance. The engage portions 35a forms the arc-shaped surface facing with each other with the predetermined radius R and is widened so as to separate from each other centering on a coil center C of the spring portion 35b while keeping the predetermined radius R constant. Accordingly, the resister clip 35 is deformed, with respect to the tapered surface 29b of the outer circumferential surface of the plunger 22, from a condition in which parts of the right and left side surfaces of the engage portions 35a are in contact with a small diameter part of the tapered surface as illustrated in FIG. 3A so as to gradually widen the contact portion corresponding to an increase of the radius of the tapered surface 29b as illustrated in FIG. 3B. Thereby, the engage portions 35a move along the tapered surface and are deformed without frictionally moving in the axial direction with respect to the tapered surface.

Figure 5B:
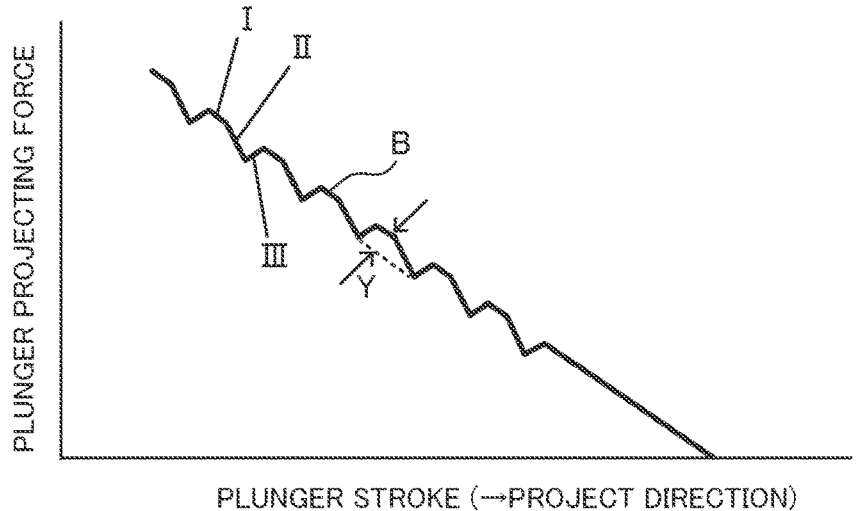
FIG. 5B is a graph indicating a plunger projecting force in a case where a resister clip of the present disclosure is used.
Figure 5C:
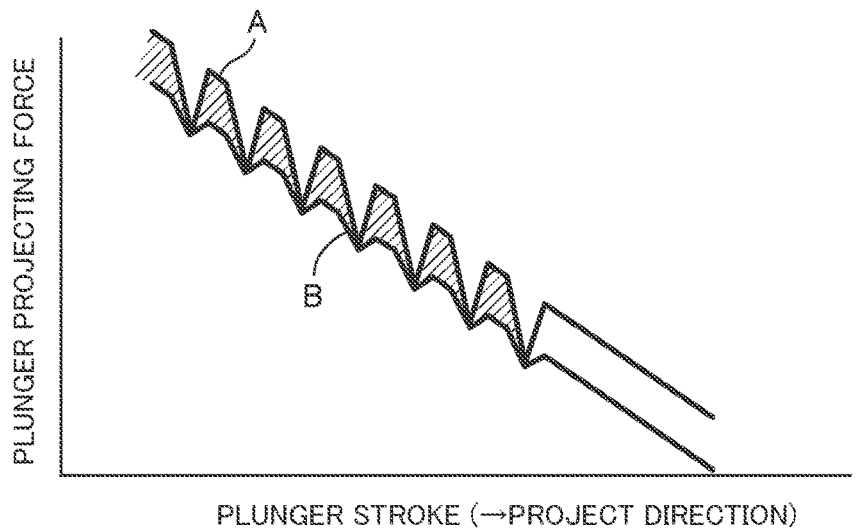
FIG. 5C is a graph comparing the projecting force of the prior art resister clip and the projecting force of the resister clip of the present disclosure.

Accordingly, because resistance of the engage portions 35a moving in the diameter-widening direction becomes small, a decrease width Y of a plunger projecting force B in a case where the resister clip 35 of the present embodiment is used as illustrated in FIG. 5B is smaller than the decrease width X of the case where the conventional resister clip 1 is used. Note that I through III indicated in FIG. 5B correspond to the positions I through III in FIGS. 4A, 4B and 4C, respectively. As illustrated in FIG. 5C, slashed portions which indicate differences of energy required in projecting the plunger 22 between the plunger projecting force A in the case of using the conventional resister clip 1 and the plunger projecting force B in the case of using the resister clip 35 of the present disclosure. The present disclosure permits to use a spring having a small spring load as the return spring 26 by reducing energy loss for bringing the resister clip 35 in sliding contact with the tapered surface 29b and widening the diameter. The load of the return spring 26 always acts on the timing chain 13 through the plunger 22 and the tensioner arm 16. It is possible to reduce friction loss of the timing chain transmission device 10 and to improve fuel consumption by reducing the load. Still further, because the diameter-widening resistance of the resister clip 35 is small even if the small load spring is used as the return spring 26, it is possible to make the plunger 22 to move forward timely and to adequately follow behavior of the chain. Thus, it is possible to prevent abnormal sound and tooth skipping from being generated due to the loosened chain.

In a case of decomposing the chain tensioner 17 due to maintenance or the like of the timing chain transmission device 10, the operating portions 35c of the resister clip 35 are pinched and pressed in the directions of arrows as illustrated in FIG. 3B. Thereby, the diameter of the engage portions 35a is widened and the engage portions 35a are disengaged from the tapered surface 29b. Then, the plunger 22 projects in the forward direction due to the return spring 26 and can be removed. It is possible to constrain the engage portions 35a of the resister clip 35 between the stop face of the retaining groove 30 and the second stop surface 32b of the guide groove 32 such that the plunger 22 is prevented from jumping out. Note that the term 'diameter-widening' means to increase the distance between the two facing engage portions 35a in the present embodiment of the present disclosure. At this time, the ends of the engage portions 35a located on a side opposite from the spring portion 35b separate most from each other. Still further, the term 'diameter-reducing' means to reduce the distance and means that the end portions approach most from each other.

Figure 6A:
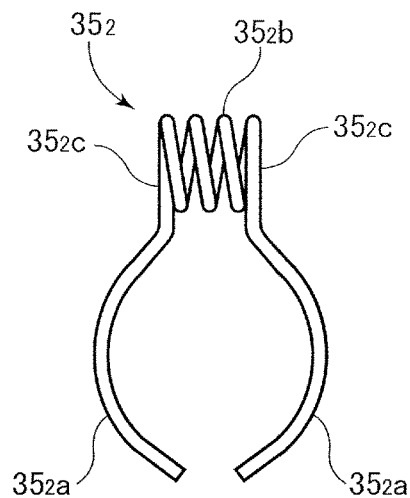
FIG. 6A illustrates a resister clip according to another embodiment.

Next, another embodiment of a resister clip of the present disclosure will be described with reference to FIGS. 6A through 6C. FIG. 6A illustrates a case where a compression coil spring is used as a spring portion $35_{2b}$. Both ends of the spring portion $35_{2b}$ are bent to form engage portions $35_{2a}$. Parts between the spring portion $35_{2b}$ and the engage portions $35_{2a}$ of the resister clip $35_2$ are stored within the cylinder 21 of the housing 20. An expanding compressive force of the spring portion $35_{2b}$ acts as a force in the diameter-reducing direction that approach the engage portions $35_{2a}$ with each other at fulcrums of contact portions with the cutout 31. In a case where the both ends of the spring portion $35_{2b}$ are operated in the compression direction, the engage portions $35_{2a}$ deform in the diameter-widening direction at the fulcrums of the contact portions. Accordingly, the both end portions of the spring portion $35_{2b}$ are operating portions $35_{2c}$ in the resister clip $35_2$.

Figure 6B:
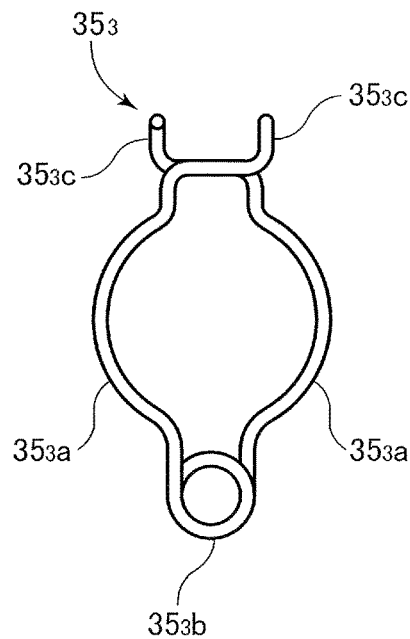
FIG. 6B illustrates a resister clip according to a still other embodiment.

FIG. 6B illustrates a resister clip $35_3$ in which a spring portion $35_{3b}$ and operating portions $35_{3c}$ are disposed opposite from each other through an engage portions $35_{3a}$. The spring portion $35_{3b}$ is a torsion coil spring of a predetermined number of turns, and both ends thereof extend upward and are bent to be arc-shaped to form the engage portions $35_{3a}$. Upper ends of the engage portions $35_{3a}$ extend upward further and are bent to form the operating portions $35_{3c}$. In the case of the resister clip $35_3$, the operating portions $35_{3c}$ are stored within the cutout 31 of the housing 20. The spring portion $35_{3b}$ generates an urging force in the diameter-reducing direction by which the engage portions $35_{3a}$ approach with each other. The engage portions $35_{3a}$ are deformed in a direction of widening the diameter by pinching and pressing the operating portions $35_{3c}$ in a direction of approaching with each other.

Figure 6C:
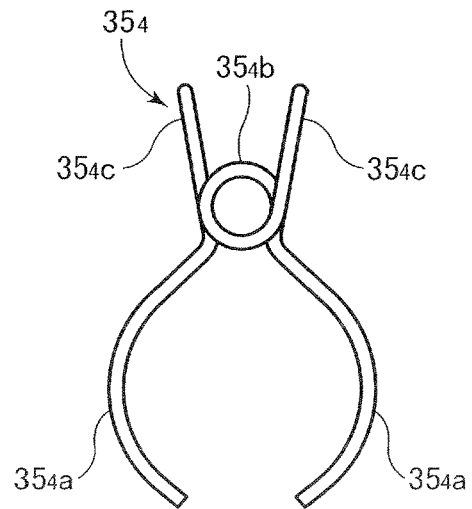
FIG. 6C illustrates a resister clip according to a different embodiment.

FIG. 6C illustrates a case where one torsion coil spring is used as a resister clip $35_4$. The one torsion coil spring forms a spring portion $35_{4b}$ having both ends bent and extended upward respectively. Then, at its upper end, the spring is bent in a manner of U turn in a front-back direction (in a direction orthogonal to a sheet surface of FIG. 6C) and extend downward. The U turn parts $35_{4c}$ are the operating portions, respectively. The parts extending downward are bent and constitute engage portions $35_{4a}$, respectively.

The spring portion $35_{4b}$ and lower parts of the both upper operating portions $35_{4c}$ are attached to the housing 20 so as to abut respectively with both side surfaces of the cutout 31. As the abutment portions are fixed, the spring portion $35_{4b}$ urges the engage portions $35_{4a}$ in a direction of approaching with each other. The engage portions $35_{4a}$ are deformed in a diameter-widening direction of separating from each other at fulcrums of the abutment portions by pressing the operating portions in a direction of approaching with each other.

Note that while the abovementioned embodiments have been applied to the chain tensioner used in the timing chain transmission device, the present disclosure is not limited to that and may be applicable to other chains such as balancer driving and oil pump driving chains and may be further applicable to auxiliary driving chain, belt or the like. That is, while the abovementioned embodiments are suitably used for a chain within an engine, the present disclosure is applicable not only to that but also to a winding transmission body tension device that applies tension to all kinds of winding transmission bodies such as a chain, a belt or the like. Still further, like the abovementioned embodiments, the present disclosure is applicable not only to the tensioner including the hydraulic damper supplying the hydraulic pressure but also to all kinds of tensioners using a return spring, an engage groove operating like a ratchet and a resister clip. Accordingly, the engage groove is applicable not only to what is provided on the outer circumferential surface of the plunger but also to what is provided on an inner circumferential surface of the cylinder.

INDUSTRIAL APPLICABILITY

The winding transmission body tension device of the present disclosure is applicable as a winding transmission body tension device that applies tension to all kinds of winding transmission bodies such as a chain and a belt.

A winding transmission body tension device of the present disclosure includes a housing (20) in which a cylinder is formed, a plunger (22) sliderably fitted into the cylinder (21) formed in the housing (20), a return spring (26) compressed between a bottom portion of the cylinder (21) and the plunger (22), and a resister clip (35) interposed between one of a plurality of engage grooves (29) disposed on one of an inner circumferential surface of the cylinder (21) and an outer circumferential surface of the plunger (22) and a guide groove (32) disposed on another one of the inner circumferential surface of the cylinder (21) and the outer circumferential surface of the plunger (22) and permits the plunger (22) to move in a forward direction in conformity with an urging force of the return spring (26) and regulates the plunger (22) from moving in a setback direction resisting against the urging force of the return spring (26). The resister clip (35) includes engage portions (35a) engageable with an engage groove (29), a spring portion (35b) operative to apply a urging force to the engage portion in a direction of engaging with the engage groove and operating portions (35c) operative to release the engage portions (35a) out of the engage groove (29).

For instance, as illustrated in FIGS. 3A and 3B, the engage portions (35a) is formed of an arc-shaped surface having a predetermined radius (R).

For instance, as illustrated in FIGS. 3A, 3B, 6B and 6C, the spring portion ($35b$, $35_{3b}$, $35_{4b}$) is a torsion coil spring of a predetermined number of turns.

For instance, as illustrated in FIG. 6A, the spring portion ($35_{2b}$) is a compression coil spring.

For instance, as illustrated in FIGS. 3A and 3B, the resister clip (35) is configured such that the operating portions (35c) are disposed between the engage portions (35a) and the spring portion (35b).

For instance, as illustrated in FIG. 6B, the resister clip ($35_3$) is configured such that the engage portions ($35_{3a}$) are disposed between the spring portion ($35_{3b}$) and the operating portions ($35_{3c}$).

For instance, as illustrated in FIG. 6C, the resister clip ($35_4$) is configured such that the spring portion ($35_{4b}$) is disposed between the engage portions ($35_{4a}$) and the operating portions ($35_{4c}$).

For instance, as illustrated in FIG. 2, the plurality of engage grooves (29) is formed on the outer circumferential surface of the plunger (22) and the guide groove (32) is formed on the inner circumferential surface of the cylinder (21). The engage groove (29) includes a tapered surface (29b) provided on a rear side thereof and a locking surface (29a) provided on a front side thereof. Then, the engage portions (35a) of the resister clip (35) are widened by moving along the tapered surface (29b) by pressure acting on the plunger (22) and transfer to adjacent one of the engage grooves.

For instance, as illustrated in FIG. 2, the winding transmission body tension device includes a check valve (25) disposed between a supply port (23) communicating with the cylinder (21) provided in the housing (20) and the cylinder (21) to regulate a flow of oil flowing from the cylinder (21) to the supply port (23).

Because the resister clip includes the spring portion besides the engage portions engaging with the engage groove, it is possible to freely design a number of turns of the coil, a winding diameter and others influential to a spring constant besides the engage portions affected by a radial size of the plunger and a shape of the engage groove. The engage portions can be also readily designed and manufactured as arc-shaped surfaces having the predetermined radius. That is, the resister clip can be designed with a high degree of freedom and can be configured to reduce a resistant force in sliding along the engage groove. This arrangement makes it possible to reduce a load of the return spring acting on the plunger, to optimize a projecting force of the plunger and to reduce a friction loss between a tensioner, always acting by the return spring, and the winding transmission body. Then, even if the load of the return spring is reduced, the plunger can be moved forward with adequate timing because the resistant force of the resister clip is low.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A winding transmission body tension device comprising:
- a housing in which a cylinder is formed;
- a plunger slideably fitted into the cylinder formed in the housing;
- a return spring compressed between a bottom portion of the cylinder and the plunger; and
- a resister clip interposed between one of a plurality of engage grooves disposed on one of an inner circumferential surface of the cylinder and an outer circumferential surface of the plunger and a guide groove disposed on an other one of the inner circumferential surface of the cylinder and the outer circumferential surface of the plunger, the resister clip permitting the plunger to move in a forward direction in conformity with an urging force of the return spring and regulating the plunger from moving in a setback direction resisting against the urging force of the return spring,
- wherein the resister clip comprises engage portions engageable with each of the engage grooves, a spring portion applying an urging force to the engage portions in a direction of engaging with the engage grooves, and operating portions configured to be pinched towards each other so as to release the engage portions out of the engage grooves,
- wherein the engage portions, the spring portion, and the operating portions are integrally formed, and
- wherein the operating portions are disposed between the engage portions and the spring portion.

2. The winding transmission body tension device according to claim 1, wherein each of the engage portions, is formed of an arc-shaped surface with a predetermined radius.

3. The winding transmission body tension device according to claim 1, wherein the spring portion is a torsion coil spring of a predetermined number of turns.

4. The winding transmission body tension device according to claim 1, wherein the engage portions are free ends of the spring portion.

5. The winding transmission body tension device according to claim 1,
- wherein the plurality of engage grooves are formed on the outer circumferential surface of the plunger and the guide groove is formed on the inner circumferential surface of the cylinder,
- wherein each of the engage grooves includes a tapered surface provided on a rear side thereof and a locking surface provided on a front side thereof, and
- wherein the engage portions of the resister clip are widened due to movement along the tapered surfaces, and the engage portions transfer to an adjacent one of the engage grooves due to pressure acting on the plunger.

6. The winding transmission body tension device according to claim 5, further comprising a check valve disposed between a supply port communicating with the cylinder provided in the housing and the cylinder to regulate a flow of oil flowing from the cylinder to the supply port.

7. A winding transmission body tension device comprising:
- a housing in which a cylinder is formed;
- a plunger slideably fitted into the cylinder formed in the housing;
- a return spring compressed between a bottom portion of the cylinder and the plunger; and
- a resister clip interposed between one of a plurality of engage grooves disposed on one of an inner circumferential surface of the cylinder and an outer circumferential surface of the plunger and a guide groove disposed on an other one of the inner circumferential surface of the cylinder and the outer circumferential surface of the plunger, the resister clip permitting the plunger to move in a forward direction in conformity with an urging force of the return spring and regulating the plunger from moving in a setback direction resisting against the urging force of the return spring,
- wherein the resister clip comprises engage portions engageable with each of the engage grooves, a spring portion applying an urging force to the engage portions in a direction of engaging with the engage grooves, and operating portions operative so as to release the engage portions out of the engage grooves, and
- wherein the resister clip is configured such that the spring portion is disposed between the engage portions and the operating portions.

* * * * *